US011531919B2

(12) United States Patent
Murugesan et al.

(10) Patent No.: US 11,531,919 B2
(45) Date of Patent: Dec. 20, 2022

(54) BUILDING SYSTEM WITH PROBABILISTIC FORECASTING USING A RECURRENT NEURAL NETWORK SEQUENCE TO SEQUENCE MODEL

(71) Applicant: Johnson Controls Tyco IP Holdings LLP, Milwaukee, WI (US)

(72) Inventors: Sugumar Murugesan, Santa Clara, CA (US); Young M. Lee, Old Westbury, NY (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 583 days.

(21) Appl. No.: 16/549,037

(22) Filed: Aug. 23, 2019

(65) Prior Publication Data
US 2021/0056452 A1   Feb. 25, 2021

(51) Int. Cl.
*G06F 9/44* (2018.01)
*G06N 7/00* (2006.01)
*G06F 17/18* (2006.01)
*G06N 3/08* (2006.01)
*G06N 5/04* (2006.01)
*H02J 3/00* (2006.01)
*G06N 20/00* (2019.01)

(52) U.S. Cl.
CPC ............ *G06N 7/005* (2013.01); *G06F 17/18* (2013.01); *G06N 3/08* (2013.01); *G06N 5/04* (2013.01); *G06N 20/00* (2019.01); *H02J 3/00* (2013.01); *H02J 2203/20* (2020.01)

(58) Field of Classification Search
CPC .................................................. G06N 7/005

USPC ............................................................ 703/2
See application file for complete search history.

(56) References Cited

U.S. PATENT DOCUMENTS 8,578,494 B1 * 11/2013 Engler .................. G06F 21/552
702/179
2014/0058572 A1 * 2/2014 Stein .................. H02J 13/00028
700/291

(Continued)

OTHER PUBLICATIONS

Energy Efficiency Trends in Residential and Commercial Building, U.S. Department of Energy, dated Oct. 2008, 32 pages.

(Continued)

*Primary Examiner* — Timothy A Mudrick
(74) *Attorney, Agent, or Firm* — Foley & Lardner LLP

(57) ABSTRACT

A building system for building data point prediction, the building system comprising one or more memory devices configured to store instructions, that, when executed by one or more processors, cause the one or more processors to receive first building data for a building data point of a building and generate training data, the training data comprising a probability distribution sequence comprising a first probability distribution for the building data point. The instructions cause the one or more processors to train a prediction model based on the training data, receive second building data for the building data point, and predict, for one or more time-steps into the future, one or more second probability distributions with the second building data based on the prediction model, each of the one or more second probability distributions being a probability distribution for the building data point at one of the one or more time-steps.

20 Claims, 12 Drawing Sheets

(56) References Cited

U.S. PATENT DOCUMENTS

2018/0183823 A1* 6/2018 Fadlil ...................... G06N 3/08
2018/0225585 A1* 8/2018 Dong ...................... G06N 7/08
2018/0375444 A1 12/2018 Gamroth

OTHER PUBLICATIONS

Understanding LSTM Networks, dated Aug. 27, 2015, 13 pages. https://colah.github.io/posts/2015-08-Understanding-LSTMs/.

* cited by examiner

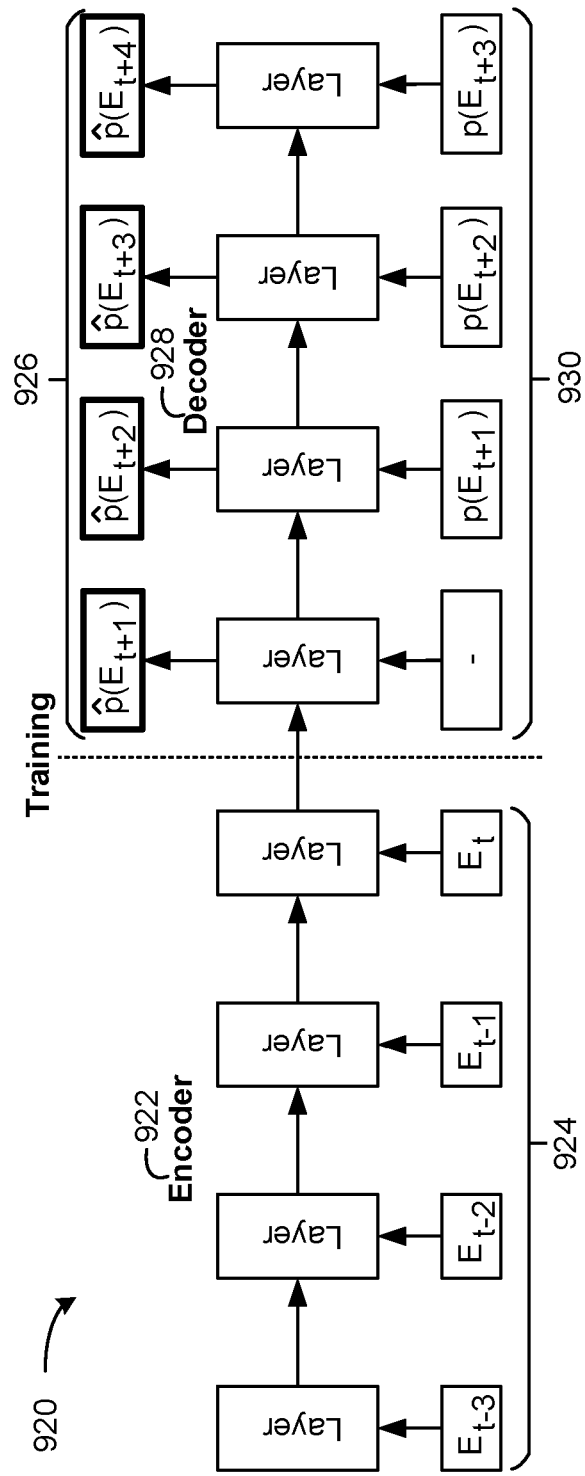
FIG. 10
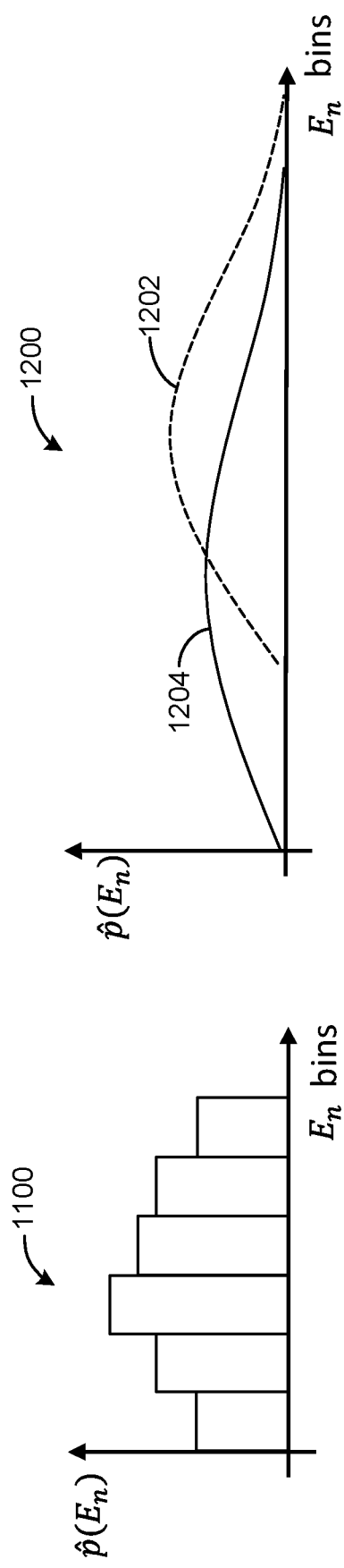
FIG. 12
FIG. 11

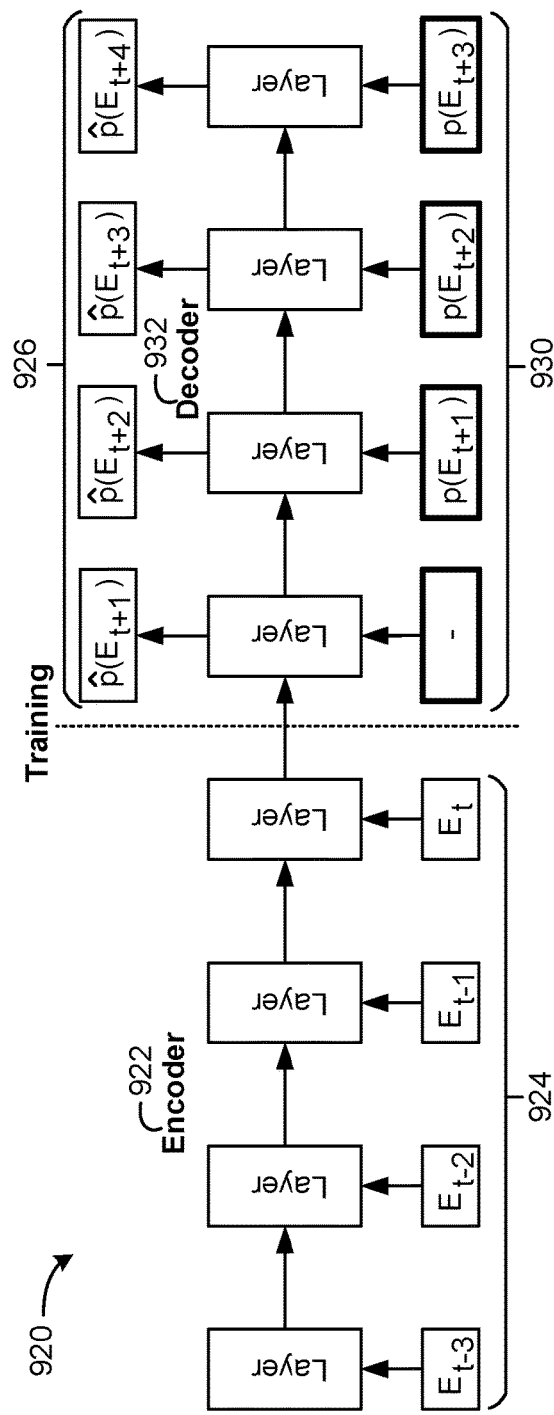
FIG. 13
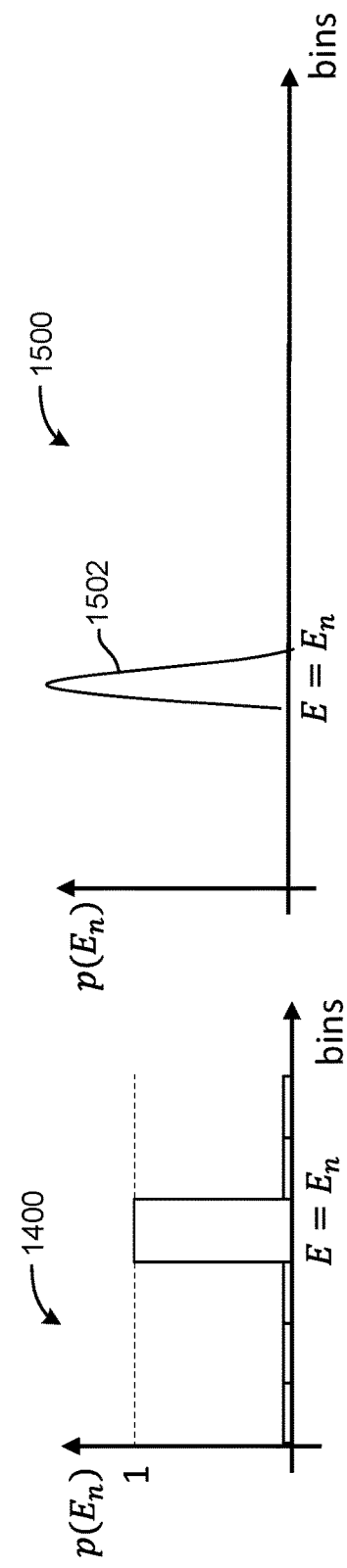
FIG. 15
FIG. 14

BUILDING SYSTEM WITH PROBABILISTIC FORECASTING USING A RECURRENT NEURAL NETWORK SEQUENCE TO SEQUENCE MODEL

BACKGROUND

The present disclosure relates generally to building systems. More particularly, the present disclosure relates to prediction models for building systems.

Building energy consumption constitutes approximately seventy two percent of overall electricity consumption in the United States. It may be important for building managers to be equipped with energy forecasts for their buildings several hours in advances so that building managers can plan activities to both reduce a carbon footprint of their building and cost of electricity for their building. Any time-series forecast, including energy forecast, is inherently stochastic, that is, deviations are expected between forecasted values and the actual values. These deviations can vary with time. Without understanding the intensity of these deviations ahead of time, building managers may be at a disadvantage and may not be able to plan for such deviations appropriately.

SUMMARY

One implementation of the present disclosure is a building system for probabilistic building data point forecasting, the building system comprising one or more memory devices configured to store instructions thereon that, when executed by one or more processors, cause the one or more processors to receive first building data for a building data point of a building and generate training data based on the first building data, the training data comprising a probability distribution sequence comprising a first probability distribution for the building data point at each of a plurality of time-steps. The instructions further cause the one or more processors to train a prediction model based on the training data, receive second building data for the building data point, and predict, for one or more time-steps into the future, one or more second probability distributions with the prediction model based on the second building data, each of the one or more second probability distributions being a probability distribution for the building data point at one of the one or more time-steps.

In some embodiments, the instructions cause the one or more processors to perform at least one of operating one or more pieces of building equipment based on the one or more second probability distributions or generating one or more user interfaces including interface elements, the interface elements based on the one or more second probability distributions.

In some embodiments, the building data point is an energy consumption data point indicating total energy consumption of the building.

In some embodiments, the first probability distribution for the building data point at each of the plurality of time-steps indicates first probabilities of a plurality of predefined bins, each of the plurality of predefined bins representing a predefined range of values of the building data point. In some embodiments, the one or more second probability distributions indicate second probabilities of the plurality of predefined bins.

In some embodiments, the prediction model comprises an encoder and a decoder. In some embodiments, the training data further comprises an actual value sequence of actual values of the building data point. In some embodiments, the instructions cause the one or more processors to train the prediction model based on the training data with the actual value sequence as an encoder input into the encoder and the probability distribution sequence as a decoder input into the decoder.

In some embodiments, the prediction model includes an encoder and a decoder. In some embodiments, the second building data comprises an actual value sequence of actual values of the building data point. In some embodiments, the instructions cause the one or more processors to predict, for the one or more time-steps into the future, the one or more second probability distributions with the second building data based on the prediction model with the actual value sequence as an encoder input into the encoder and at least one of at least some of the one or more second probability distributions or one or more previously predicted probability distributions as decoder inputs into the decoder.

In some embodiments, the prediction model is a recurrent neural network (RNN) sequence to sequence (S2S) model.

In some embodiments, the RNN S2S model is a long-short term memory (LSTM) S2S neural network.

In some embodiments, the first probability distribution for the building data point at each of the plurality of time-steps and the one or more second probability distributions are at least one of a histogram indicating a probability level of a plurality of predefined bins with a particular probability value for each of the plurality of predefined bins or a Gaussian mixture model indicating probability levels of a continuous range of energy values with a plurality of Gaussian components, each of the plurality of Gaussian components comprising a mean, a standard deviation, and a mixture value.

In some embodiments, the histogram for the first probability distribution indicates the probability level with a probability of one for one of the plurality of predefined bins and a probability of zero for all other bins of the plurality of predefined bins.

In some embodiments, the Gaussian mixture model for the first probability distribution indicates the probability levels of the continuous range of energy values with one Gaussian component of the plurality of Gaussian components with a particular mean of an actual data point value, an infinitesimally small standard deviation, and a particular mixture value of one, wherein the mixture value of each other Gaussian component of the plurality of Gaussian components is zero.

Another implementation of the present disclosure is a method of probabilistic building data point forecasting, the method including receiving, by a processing circuit, first building data for a building data point of a building, generating, by the processing circuit, training data based on the first building data, the training data comprising a probability distribution sequence comprising a first probability distribution for the building data point at each of a plurality of time-steps, and training, by the processing circuit, a prediction model based on the training data. The method further includes receiving, by the processing circuit, second building data for the building data point and predicting, by the processing circuit, for one or more time-steps into the future, one or more second probability distributions with the prediction model based on the second building data, each of the one or more second probability distributions being a probability distribution for the building data point at one of the one or more time-steps.

In some embodiments, the first probability distribution for the building data point at each of the plurality of time-steps indicates first probabilities of a plurality of predefined bins, each of the plurality of predefined bins representing a predefined range of values of the building data point. In some embodiments, the one or more second probability distributions indicate second probabilities of the plurality of predefined bins.

In some embodiments, the prediction model comprises an encoder and a decoder. In some embodiments, the training data further comprises an actual value sequence of actual values of the building data point. In some embodiments, training, by the processing circuit, the prediction model based on the training data comprises training the prediction model based with the actual value sequence as an encoder input into the encoder and the probability distribution sequence as a decoder input into the decoder.

In some embodiments, the prediction model comprises an encoder and a decoder. In some embodiments, the second building data comprises an actual value sequence of actual values of the building data point. In some embodiments, predicting, by the processing circuit, for the one or more time-steps into the future, the one or more second probability distributions with the second building data comprises predicting the one or more second probability distributions based on the prediction model with the actual value sequence as an encoder input into the encoder and at least one of at least some of the one or more second probability distributions or one or more previously predicted probability distributions as decoder inputs into the decoder.

In some embodiments, the prediction model is a recurrent neural network (RNN) sequence to sequence (S2S) model.

In some embodiments, the RNN is a long-short term memory (LSTM) S2S neural network.

In some embodiments, the first probability distribution for the building data point at each of the plurality of time-steps and the one or more second probability distributions are at least one of a histogram indicating a probability level of a plurality of predefined bins with a particular probability value for each of the plurality of predefined bins or a Gaussian mixture model indicating probability levels of a continuous range of energy values with a plurality of Gaussian components, each of the plurality of Gaussian components comprising a mean, a standard deviation, and a mixture value.

In some embodiments, the histogram for the first probability distribution indicates the probability level with a probability of one for one of the plurality of predefined bins and a probability of zero for all other bins of the plurality of predefined bins. In some embodiments, the Gaussian mixture model for the first probability distribution indicates the probability levels of the continuous range of energy values with one Gaussian component of the plurality of Gaussian components with a particular mean of an actual data point value, an infinitesimally small standard deviation, and a particular mixture value of one, wherein the mixture value of each other Gaussian component of the plurality of Gaussian components is zero.

Another implementation of the present disclosure is a building management system, the building management system comprising a processing circuit configured to receive building data for a building data point of a building and predict, for one or more time-steps into the future, one or more probability distributions with the building data based on the prediction model, each of the one or more probability distributions being a probability distribution for the building data point at one of the one or more time-steps. The prediction model is a model trained with training data, the training data comprising a probability distribution sequence comprising a particular probability distribution for the building data point at each of a plurality of time-steps.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 10 is a block diagram of the LSTM S2S neural network of FIG. 9 shown in greater detail in a training phase with emphasis on predicted probability distributions of the LSTM S2S neural network, according to an exemplary embodiment.

FIG. 11 is a chart of a histogram of one of the predicted probability distributions of the LSTM S2S neural network of FIG. 10, according to an exemplary embodiment.

FIG. 12 is a chart of a Gaussian mixture model of one of the predicted probability distributions of the LSTM S2S neural network of FIG. 10, according to an exemplary embodiment.

FIG. 13 is a block diagram of the LSTM S2S neural network of FIG. 9 shown in greater detail in a training phase with emphasis on actual probability distributions fed into the LSTM S2S neural network, according to an exemplary embodiment.

FIG. 14 is a chart of a histogram of one of the actual probability distributions fed into the LSTM S2S neural network of FIG. 13 during the training phase, according to an exemplary embodiment.

FIG. 15 is a chart of a Gaussian mixture model of one of the actual probability distributions fed into the LSTM S2S neural network of FIG. 13 during the training phase, according to an exemplary embodiment.

DETAILED DESCRIPTION

Overview

Figure 1:
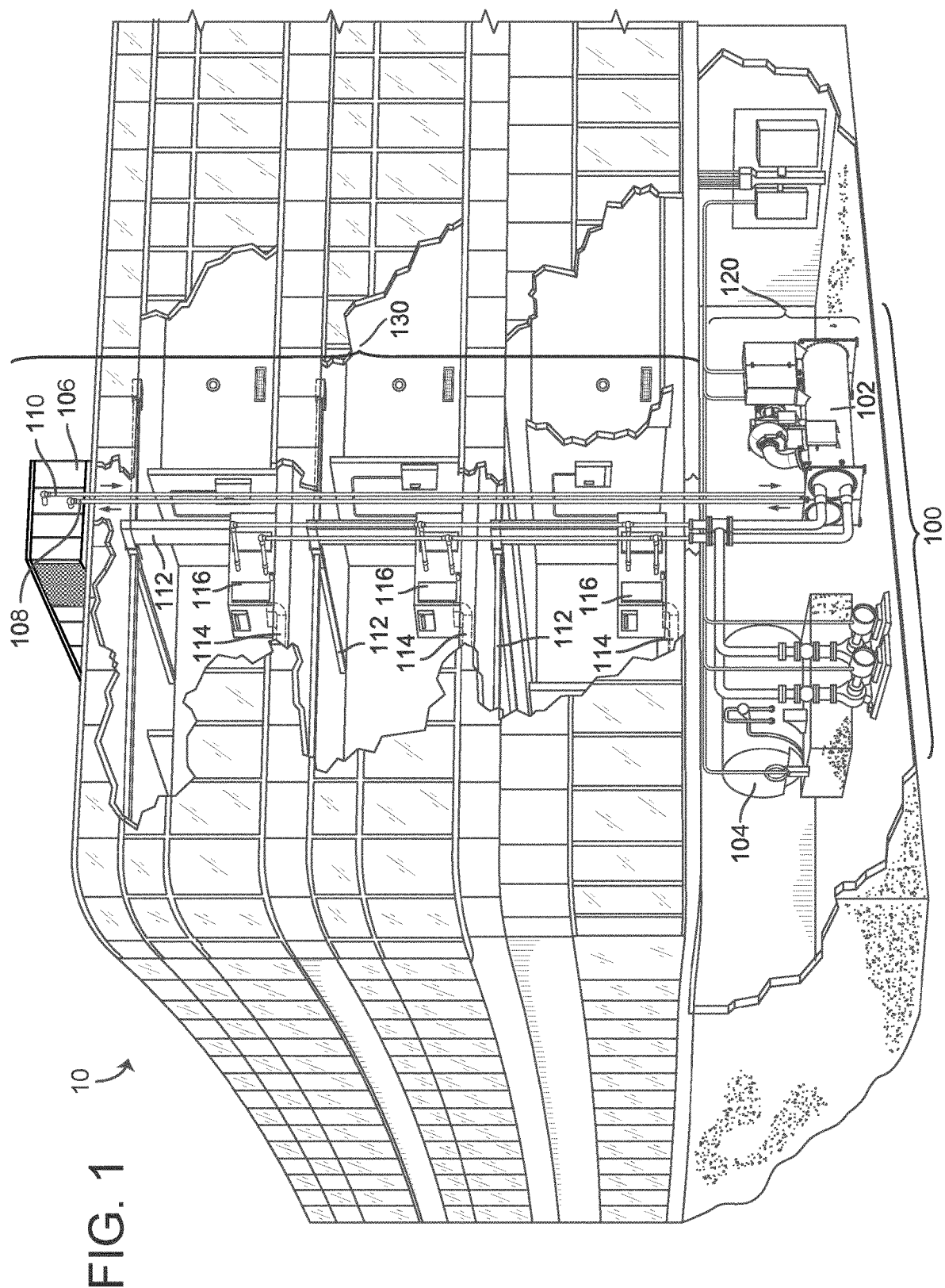
FIG. 1 is a drawing of a building equipped with a HVAC system, according to an exemplary embodiment.

Referring generally to the FIGURES, a building system with a prediction model for probabilistic data point forecast is shown, according to various exemplary embodiments. The building system can be configured to generate and train a prediction model. The building system can further be configured to generate a probabilistic data point forecast based on the prediction model. A probabilistic forecast may be a forecast for a particular data point indicating the probability that, at one or multiple future times, the data point will be a particular value. The prediction model can be configured to predict any kind of data point, for example, ambient temperature, energy usage of a building, campus, or a piece of equipment, ambient humidity, occupancy, and/or any other building data point.

A building manager may desire to understand a confidence interval forecast for a particular data point, for example building energy consumption, instead of only a single value forecast (i.e., a point forecast). In this regard, the probabilistic forecast of the present disclosure can aid building managers in understanding the confidence of future data point predictions. For example, the building system can be configured to generate a prediction with information indicating that energy consumption of a building three hours in the future will be between 8 kWh and 14 kWh with a 90% confidence. Alternatively, the information may indicate a predicted energy of 10 kWh to 12 kWh with 80% confidence at three hours in the future. These exemplary probabilistic forecasts can help a building manager, or building control software, to not only understand what a predicted data point will be in the future but also at what confidence the data point will be a particular predicted value or within a particular range of values.

In some embodiments, many different types of prediction models can be trained by the building system. In some embodiments, the model is any kind of sequence to sequence model including an encoder and/or a decoder. In some embodiments, the prediction model is a neural network, a Bayesian network, a decision tree, etc. In some embodiments, the prediction model is a recurrent neural network (RNN). For example, a long-short term memory (LSTM) sequence to sequence (S2S) neural network (a type of RNN) and/or any other type of RNN (e.g., a gated recurrent unit (GRU) neural network) can be utilized by the building system as the prediction model, i.e., to predict a particular point forecast and/or probabilistic forecast of a data point. In some embodiments, one or more specific methodologies can be used by the building system to implement a probabilistic forecast for one or multiple time-steps into the future to train a LSTM S2S neural network, i.e., to feed a probabilistic forecast of one time-step into the LSTM S2S to generate a probabilistic-forecast for a second subsequent time-step. The networks can predict the particular point forecast and/or probabilistic forecast based on one or multiple current and historical values of a data point.

In some embodiments, the building system utilizes a specific methodology for training and inference for an LSTM S2S neural network in order to generate a probabilistic data point forecast. The methodology can utilize a probabilistic forecast in one time-step to obtain probabilistic forecast in a subsequent time-step within an LSTM S2S neural network.

During model training, a probabilistic forecast in one time-step can be modified by the building system to represent actual energy consumption in that time-step, and the modified probabilistic forecast (the actual probabilistic forecast) can be fed-back into the LSTM S2S neural network in the next time-step to obtain probabilistic forecast in that time-step. More specifically, the building system can be configured to generate a probability distribution representing an actual energy value and the generated probability distribution can be fed into a decoder of the LSTM S2S neural network in one or more next steps during training of the LSTM S2S neural network. The time-steps of the sequences may represent instantaneous points in time or may indicate a range of times, e.g., energy at a particular point in time or average energy over an hour.

Regarding model inference, the building system can be configured to retain a probabilistic forecast in one time-step as-is, and feedback the retained probabilistic forecast for the time-step to the LSTM S2S neural network for the next time-step to obtain a probabilistic forecast in the next time-step. More specifically, the probabilistic forecast, an estimated probability distribution, of a time-step can be fed back into the decoder of the LSTM S2S neural network as-is to generate a probabilistic forecast of one or multiple subsequent time-steps. In some embodiments, the probabilistic forecast can be a histogram forecast and/or a Gaussian Mixture Model forecast.

Building Management System and HVAC System

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
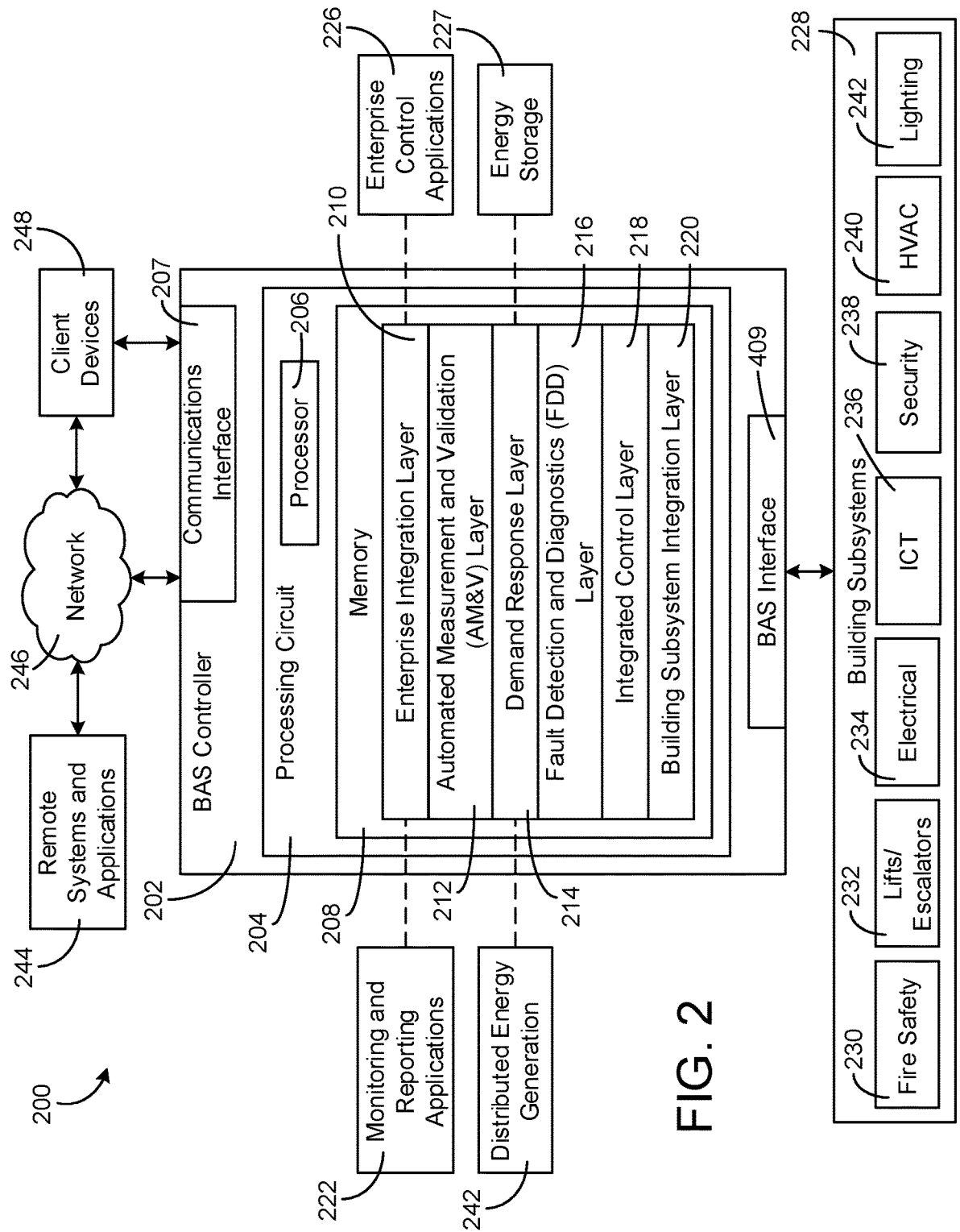
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

Figure 4:
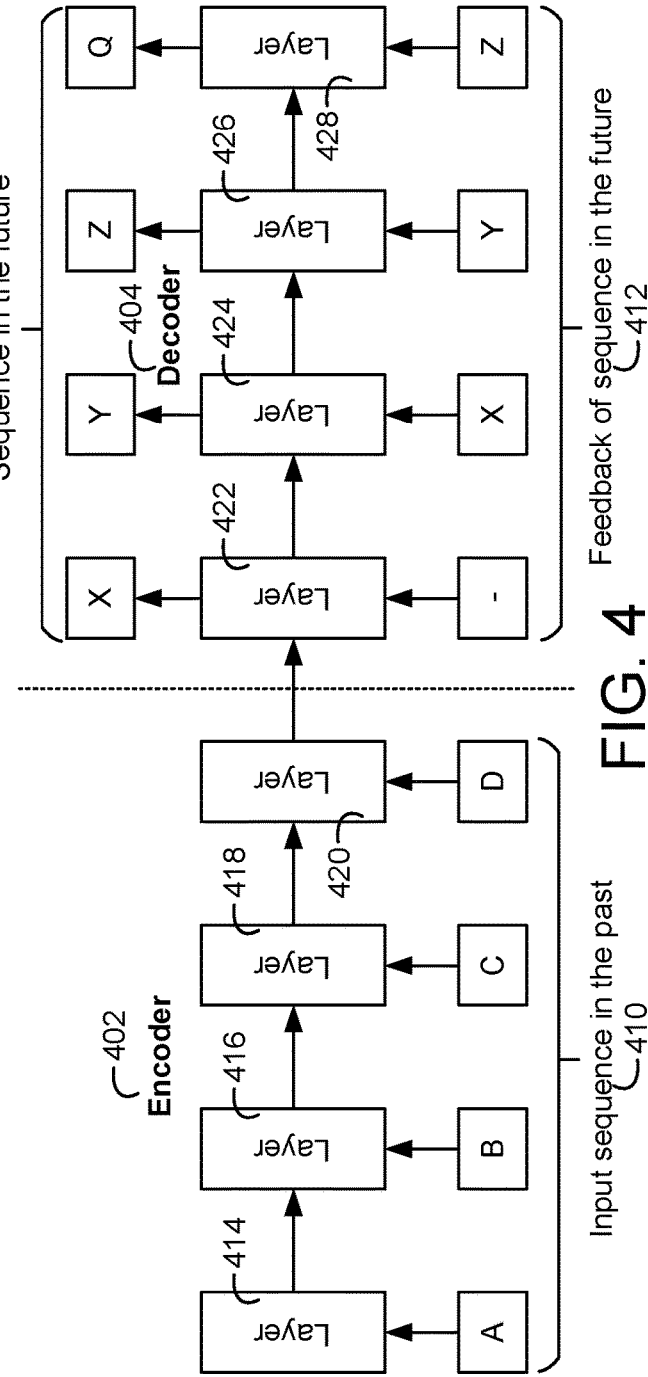
FIG. 4 is a block diagram of a long-short term memory sequence to sequence (LSTM S2S) neural network, according to an exemplary embodiment.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 4 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data sources, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Probabilistic Data Point Forecast

Figure 3:
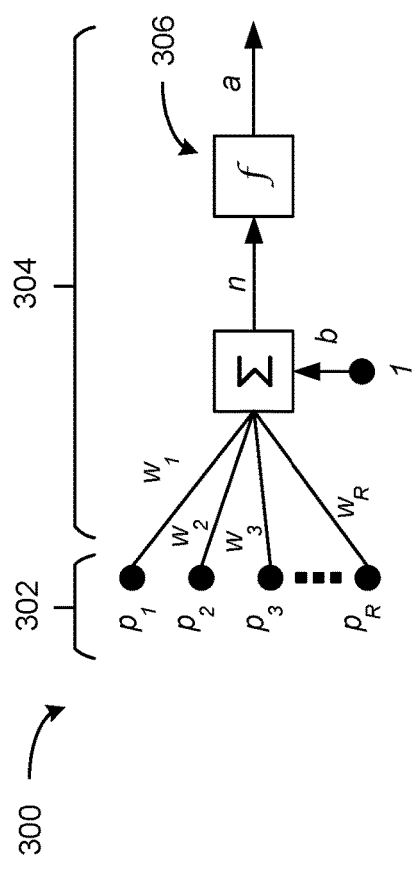
FIG. 3 is a block diagram of a neuron of a neural network, according to an exemplary embodiment.

Referring now to FIG. 3, a neuron 300 that can be used in a neural network is shown, according to an exemplary embodiment. In a neural network, many neurons 300 can be used to generate an output from an input. The neuron 300 can be configured to include one or more input signals 302 and a neuron body 304. In some embodiments, the input signals 302 are provided by a particular data source. In other embodiments, the input signals 302 are provided by a previous neural network layer having one or more neurons 300. The neuron body 304 includes a series of weights assigned to each of the input signals 302 by which each input signal is multiplied in the neural network. The neuron body 304 also includes a summation operation which takes the product all input signals 302 and their associated weights and add them together. Furthermore, a single bias value, b, is assigned to each neuron 300 and added to the sum of all weighted input signals 302. The weights and bias values can vary between the neurons 300 used in a neural network. In some embodiments, the summation operation is defined as follows:

$$n = b + \sum_{x=1}^{R}(p_x \times w_x)$$

The output of the summation operation and bias value is denoted as n in FIG. 3. The output, n, may then be provided as input to an activation function 306. The activation function 306 is a function applied to n for each neuron 300 in order to adjust the neuron activation level into some that range of values. In some embodiments, the activation function 306 is applied to the output, n, to transform the output into some real number between zero and one. In some embodiments, the activation function 306 is configured as a sigmoid function having the following form:

$$a = \frac{1}{1+e^x}$$

In another embodiment, the activation function 306 could be configured as a rectified linear unit function (ReLU) having the following form:

$$a = \max(0, x)$$

In other embodiments, the activation function 306 could be some other linear or nonlinear function. The activation function 306 can be configured to create an activation level, a, within the desired range of real numbers. In some embodiments, the activation level of each neuron 300 is then provided as an input signal 302 to the neurons 300 of the next layer of the convolutional neural network. In some embodiments, the activation function 306 can be a tanh activation.

Referring now to FIG. 4, a LSTM S2S neural network 400 is shown, according to an exemplary embodiment. An LSTM is a type of RNN while S2S is an architectural form of neural network. The LSTM S2S neural network 400 is made of two main components, an encoder 402 and a decoder 404. The encoder 402 can receive an input sequence of a data point in the past, i.e., sequence 410. The decoder 404 can generate a sequence in the future for the data point. Furthermore, the decoder can receive feedback input sequence 412 into the decoder 404 where the sequence 412 is at least a portion of the sequence 408.

The encoder 402 can be configured to transform a sequence into a vector which is passed to the decoder 404. More specifically, the encoder 402 can be configured to generate the vector based on the sequence 410. The decoder 404 can be configured to generate a sequence based on the vector of the encoder 402 (as well as other inputs). Both the encoder 402 and the decoder 404 can include multiple layers, i.e., layers 414-428. Each of the layers 414-428 can be LSTM layers and/or deep LSTM layers. Exemplary types of RNN layers are described with reference to FIGS. 5-6. Other types of layers may be GRU neural network layers.

The sequences 408, 410, and 412 can represent historical values of a data point (the sequence 410), predicted values of the data point for one or multiple times in the future (the sequence 408), and the predicted values of the data point fed back into the decoder 404 (the sequence 412). As illustrated by FIG. 4, the input to layer 424 is the value "X" of the sequence 412 which is the output of the layer 422. Similarly, the output of the layer 424, "Y," is the input to the layer 426. Furthermore, the output of the layer 426, "Z," is the input of the layer 428. The data point can be a control point, an ambient condition data point (e.g., outdoor air temperature, humidity, air quality, etc.), energy usage of a campus or building, etc.

Figure 5:
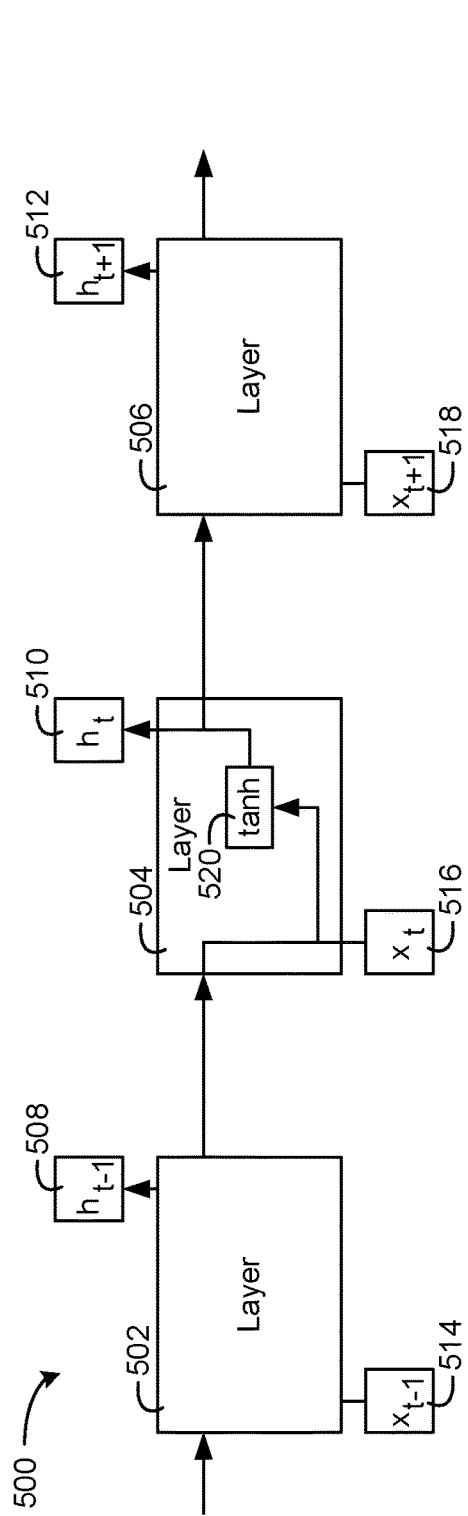
FIG. 5 is a block diagram of layers of a recurrent neural network (RNN), according to an exemplary embodiment.

Referring now to FIG. 5, layers of a RNN 500 are shown, according to an exemplary embodiment. The RNN 500 includes layers 502-506. The architecture of each of the layers 502-506 may be the same. The architecture is illustrated by the layer 504. Each of the layers 502-506 may receive an input, i.e., inputs 514-518 while each of the layers 502-506 can also generate an output 508-512. Each of the layers 502-506 may be chained together such that the output of each layer is fed into the next layer. In layer 504, the output of the layer 502 (the output 508) is fed into the layer 504 and is concatenated with the input 516. The result of the concatenation is passed through a tanh activation 520 which is subsequently passed out of the layer 504 to the layer 506, i.e., the output 510.

The architecture of the layers 502-506 allow for the RNN 500 to have memory, i.e., have persistence of outputs. However, while the RNN 500 may include memory, the memory may not be long term, i.e., the RNN 500 suffers from the vanishing gradient problem and encounters difficulty in learning long term. To address the effects of long term memory, an LSTM can be utilized.

Figure 6:
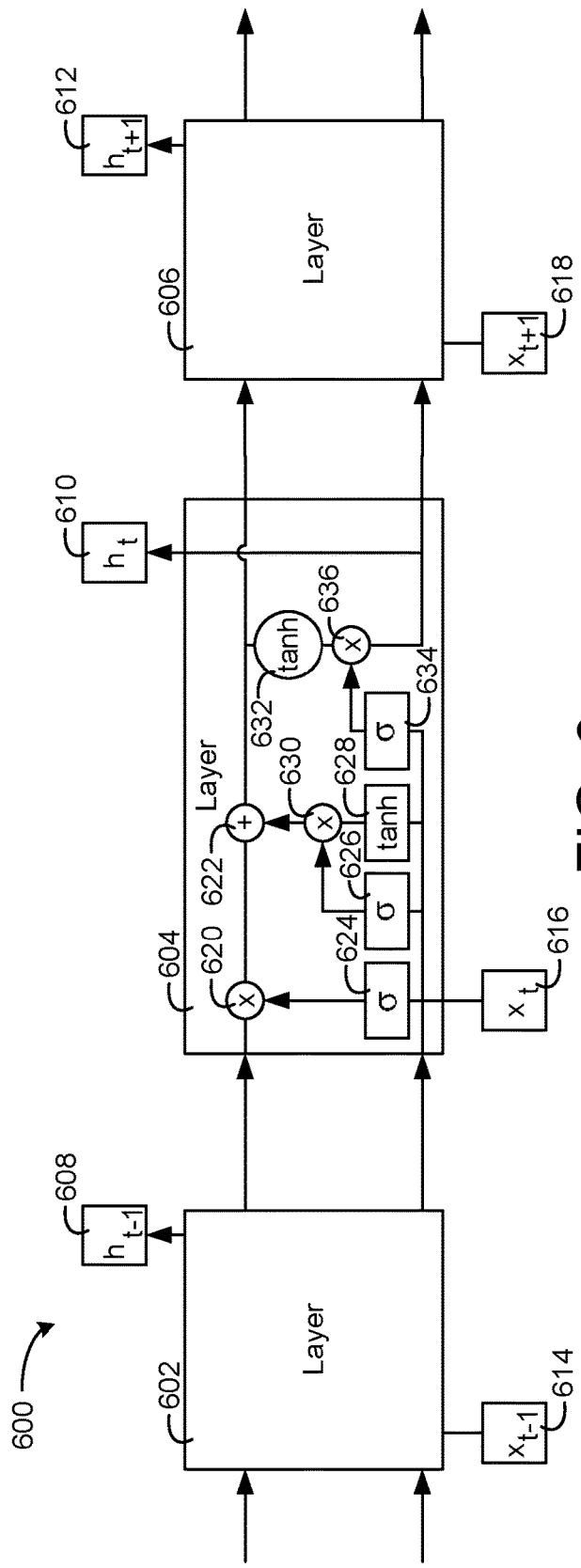
FIG. 6 is a block diagram of layers of a LSTM neural network, according to an exemplary embodiment.

Referring now to FIG. 6, a LSTM neural network 600 is shown, according to an exemplary embodiment. The LSTM neural network 600 includes layers 602-606. The architecture of each of the layers 602-606 may be the same. The architecture is illustrated by the layer 604. Each of the layers 602-606 may receive an input, i.e., inputs 614-618 while each of the layers 502-506 can also generate an output 608-612. Each of the layers 602-606 may be chained together such that the outputs of each layer is fed into the next layer. The layer 604 can include neural network layers 624, 626, 628, and 634 which are shown as tanh and sigmoid activations respectively. Furthermore, the layer 604 includes pointwise operations 620, 622, 630, 632, and 636 which represent multiplication, addition, and tanh variously. Where multiple lines between layers come together in the layer 604 represents concatenation. Greater details on RNN and LSTM networks and layer construction can be found in the publication "Understanding LSTM Networks" by Christopher Olah published on Aug. 27, 2015, the entirety of which is incorporated by reference herein.

Figure 7:
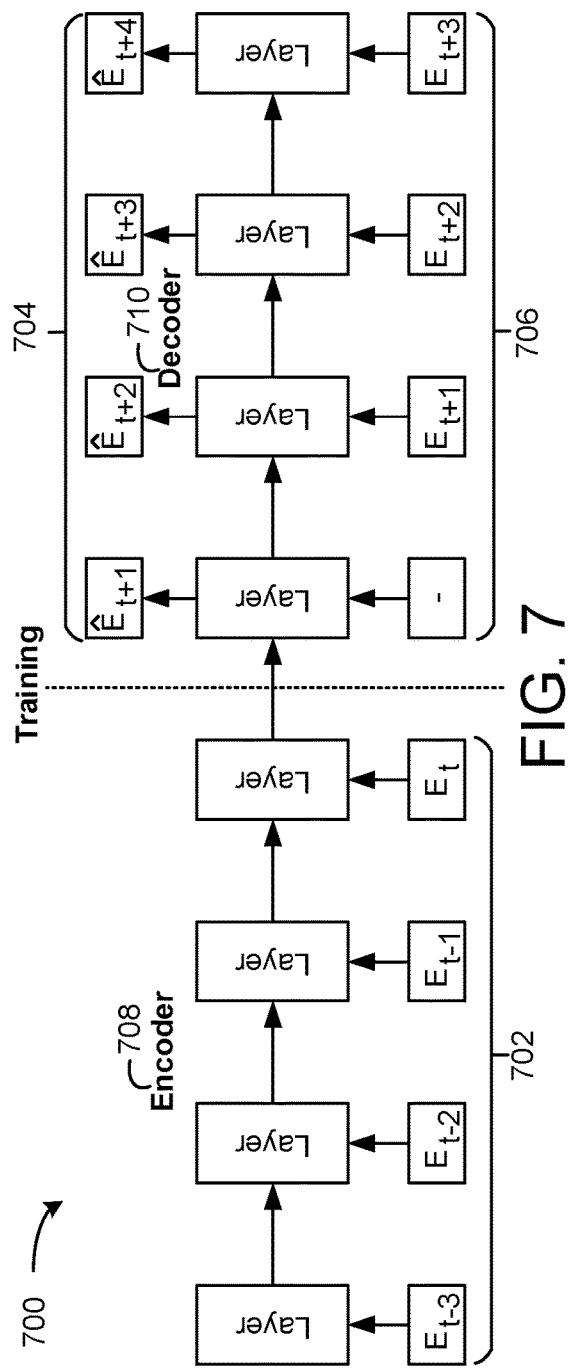
FIG. 7 is a block diagram of a LSTM S2S neural network for non-probabilistic energy forecasting is shown during a training phase, according to an exemplary embodiment.
Figure 8:
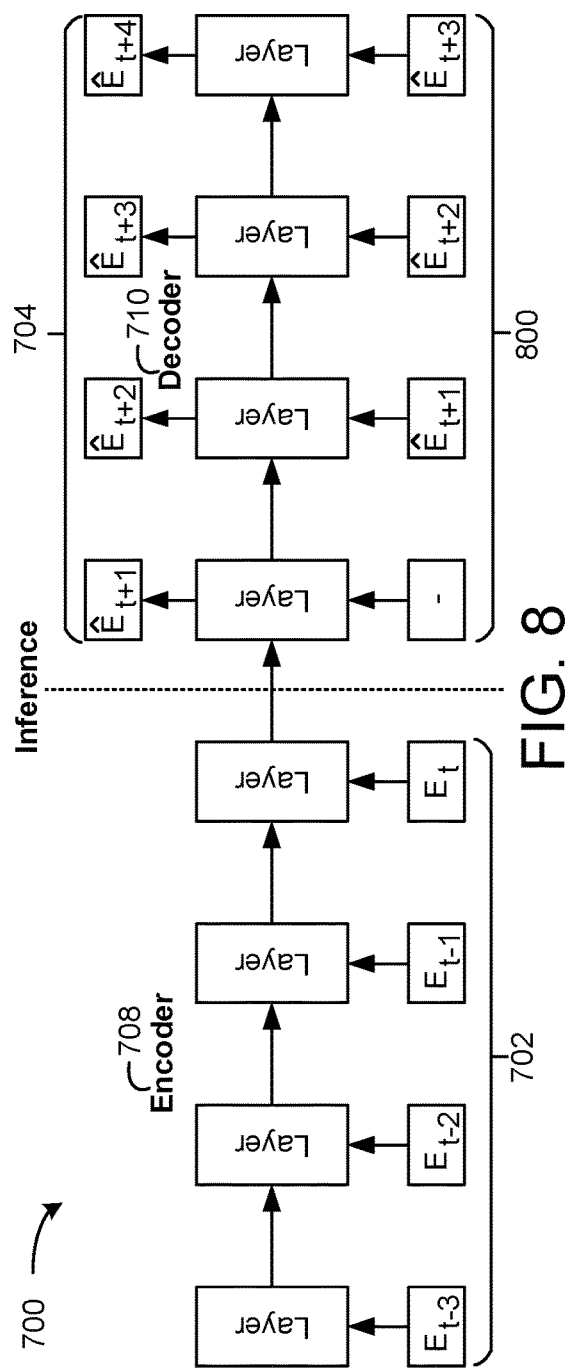
FIG. 8 is a block diagram of a LSTM S2S neural network for non-probabilistic energy forecasting is shown during an inference phase, according to an exemplary embodiment.

Referring now to FIGS. 7 and 8, an LSTM S2S neural network 700 for energy forecasting is shown during a training phase and an inference phase, according to an exemplary embodiment. The LSTM S2S 700 may be the same as or similar to the LSTM S2S 400 described with reference to FIG. 4. More particularly, the LSTM S2S neural network 700 includes an encoder 708, a decoder 710, an input sequence 702 to the encoder 708, an output sequence 704 of the decoder 710, and a feedback sequence to the decoder 710. The output of decoder 710 at each time-step can be a point-forecast of energy.

During the training phase, the feedback is actual known values of energy that the LSTM S2S 700 is attempting to predict, i.e., the sequence 706. More specifically, during the training phase, the point-forecast of the LSTM S2S 700 is ignored, and actual energy is fed back into the decoder 710 in next time-step to generate point-forecast in that time-step. During the inference phase, the feedback is the predicted energy values that the LSTM S2S 700 has predicted, i.e., the sequence 800. More specifically, during inference, this point-forecast is fed back into decoder in next time-step to generate point-forecast in that time-step Referring more particularly to FIG. 7, the LSTM S2S neural network 700, during the training phase, generates an energy forecast for a building for four time-steps into the future, i.e., $\hat{E}_{t+1}$, $\hat{E}_{t+2}$, $\hat{E}_{t+3}$, and $\hat{E}_{t+4}$, i.e., the elements of the output sequence 704 based on a current energy value and three historical energy values three time-steps prior to the current energy value, i.e., $E_{t-3}$, $E_{t-2}$, $E_{t-1}$, and $E_{t-1}$, the sequence 702. Because the current phase is the training phase, the LSTM S2S neural network 700 is trained based on known training data and thus the actual energy values that the LSTM S2S neural network 700 is attempting to predict are known. In this regard, the known values are fed into the decoder 710 as the sequence 706, i.e., $E_{t+1}$, $E_{t+2}$, and $E_{t+3}$.

Referring more particularly to FIG. 8, the LSTM S2S neural network 700, during the inference phase, generates an energy forecast for a building for use in operating equipment of a building or providing metrics to a user. Rather than using known actual values of the energy as feedback into the decoder 710, the predicted values, the sequence 704, is fed back into the decoder 710 as the sequence 800, i.e., $\hat{E}_{t+1}$, $\hat{E}_{t+2}$, and $\hat{E}_{t+3}$.

Figure 9:
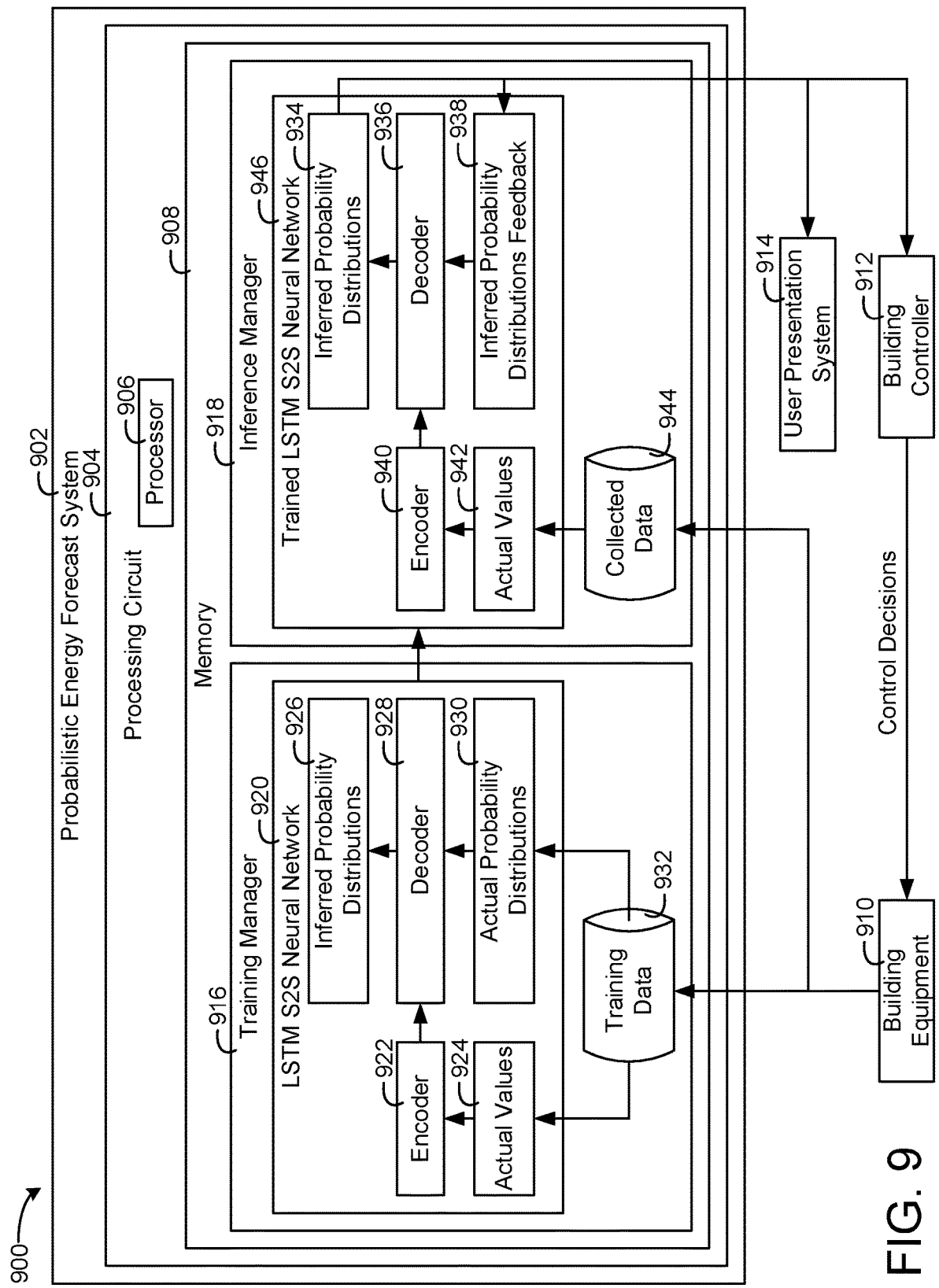
FIG. 9 is a block diagram of an probabilistic energy forecasting system that determines a probabilistic data point forecast based on a LSTM S2S neural network, according to an exemplary embodiment.

Referring now to FIG. 9, a system 900 including a probabilistic energy forecast system 902 configured to generate an inferred probabilistic forecast is shown, according to an exemplary embodiment. The probabilistic energy forecast system 902 includes a processing circuit 904, a processor 906, and a memory 908. The processor circuit 904, the processor 906, and/or the memory 908 can be the same as, or similar to, the processing circuit 204, the processor 206, and/or the memory 208 as described with reference to FIG. 2.

The memory 908 includes a training manager 916 and an inference manager 918. The training manager 916 can be configured to perform one or more operations to collect data, generate training data, and train a probabilistic energy forecasting model. The training manager 916 can receive data from the building equipment 910 for a particular data point, e.g., energy usage of a building, energy usage of a campus, energy usage of a particular piece of building equipment, outdoor air temperature, humidity, etc. The training manager 916 can, based on the collected data, generate training data 932. The training data 932 can include a known sequence of values for the data point.

Furthermore, the training data 932 can include a known sequence of probability distributions for the data point, i.e., probability distributions for particular time steps for a data point, e.g., particular values or bins (ranges) of the data point. The probability distributions can be stored in the form of a histogram of multiple bins, e.g., a probabilities for a set of bins, i.e., a probability of one for one bin and a probability of zero for all other bins since the data used in generating the probability data is known data. Each bin of the probability data may be a predefined range of values for the data point. Similarly, the training manager 916 can generate a Gaussian mixture model to represent the probabilities, i.e., a model of multiple Gaussian components, $\{\mu_m, \sigma_m, w_m\}$, i.e., a mean, standard deviation, and mixture weight for each component where there are m components.

The training manager 916 can be configured to train an LSTM S2S neural network 920 based on the training data 932. The training manager 916 can be configured to use one or multiple different training algorithms, e.g., one-dimensional optimization, multidimensional optimization (e.g., gradient descent, Newton's method, conjugate gradient, quasi Newton, Levenberg Marquardt, etc.), and/or any other optimization algorithm. The training manager 916 can feed known actual values 924 as a sequence into an encoder 922 of the neural network 920 and can feed actual probability distributions 930 into the decoder 928 as a sequence during training.

The training manager 916 is configured to minimize loss to train the LSTM S2S neural network 920, in some embodiments. In some embodiments, the loss minimized by the training manager 916 is categorical cross entropy loss. Categorical cross entropy loss minimization, or various other loss minimization techniques, may be specifically applicable for training the network 920 to output probabilities. The below equation provides a categorical cross entropy formula. The first summation is performed over samples, N, while the inner summation gives a probability that a particular sample belongs to a real class under an estimated probability model.

$$-\frac{1}{N}\sum_{i=1}^{N}\sum_{c=1}^{C} 1_{y_i \in C_c} \log p_{model}[y_i \in C_c]$$

The actual values 924 may represent a present value of the data point and one or multiple past values of the data point. The actual probability distributions 930 may represent one or more probabilities for a forecast of the neural network 920 in the future, i.e., the probabilities that the neural network 920 is configured to predict, the inferred probability forecast, the inferred probability distributions 926. Various weights and/or parameters can be determined for the encoder 922 and the decoder 928 while training the neural network 920. The result of the training can be a trained version of the neural network 920, i.e., trained LSTM S2S neural network 946.

The model 946 can include an encoder 940 and a decoder 936 which may be trained versions of the encoder 922 and the decoder 928. The encoder 940 can receive a sequence of actual values 942 for the data point, i.e., collected data 944 that the inference manager 918 collects from the building equipment 910. The sequence of actual values 942 can be a current value and values of the data point of a predefined number of time steps in the past. The decoder 936 can receive a vector of the encoder 940 and generate the inferred probability forecast, i.e., the inferred probability distributions 934.

The inferred probability distributions 934 may indicate a probability distribution for each time step of one or multiple bins, each bin representing a range of value of the data point. The decoder 936 can further receive the inferred probability distributions 934 as the inferred probability distributions feedback 938. The decoder 936, can generate the inferred probability distributions 934 based not only on the processing of the encoder 940 with the sequence of the actual values 942 but further on the predictions made by the decoder 936.

The inferred probability distributions 934 can be provided by the probabilistic energy forecast system 902 to the user presentation system 914 and/or the building controller 912. In some embodiments, the probabilistic energy forecast system 902 is used by the building controller 912 to operate the building equipment 910, e.g., control environmental conditions of a building, cause generators to turn on or off, charge or discharge batteries, etc. Furthermore, the user presentation system 914 can receive the inferred probability distributions 934 and cause a user display, e.g., the client devices 248, indications (e.g., graphical elements, charts, words, numbers, etc.) of the inferred probability distributions 934. For example, charts such as the charts shown in FIGS. 18 and 19 could be generated by the user presentation system 914 based on the inferred probability distributions 934.

Referring now to FIG. 10, the LSTM S2S neural network 920 of FIG. 9 shown in greater detail in a training phase with emphasis on the inferred probability distributions 934 is shown, according to an exemplary embodiment. The actual values 924 are shown as an input sequence of length four although the input sequence may be any length. The actual values 924 are a current actual energy value, $E_t$, and actual values one, two, and three samples in the past, i.e., $E_{t-1}$, $E_{t-2}$, and $E_{t-3}$. The output of the decoder 928, the inferred probability distributions 934 is shown as a probability distribution of energy one, two, three, and four samples into the future, i.e., $\hat{p}(E_{t+1})$, $\hat{p}(E_{t+2})$, $\hat{p}(E_{t+3})$, and $\hat{p}(E_{t+4})$. The output of the decoder 928 during training at any time-step, n, is an estimated distribution of energy at that time-step, i.e., one of the inferred probability distributions 926 at a particular time-step.

Since the LSTM S2S neural network 916 is in a training phase, i.e., various weights and parameters of the LSTM S2S neural network 916 are being determined, the feedback into the decoder 928 is not the inferred probability forecast, i.e., the inferred probability distributions 926, but rather a known probability forecast determined by the training manager 916 from data received from the building equipment 910. The known probability forecast, the actual probability distributions 930, can be determined by the training manager 916 before the LSTM S2S neural network 916 is trained. The known probability forecast is described in greater detail with respect to FIGS. 13-15.

Referring now to FIG. 11, a chart 1100 of a histogram of one of the predicted probability distributions of the LSTM S2S neural network 916 is shown, according to an exemplary embodiment. The chart 1100 may indicate the probability of various energy bins for a particular time-step, n, i.e., a single output of the decoder 923, e.g., $\hat{p}(E_{t+2})$ or any other output. The x-axis of the chart 1100 indicates various energy bins, i.e., predefined ranges of energy. Six bins are shown in the chart 1100 but the chart 1100 (and the LSTM S2S neural network 916) can have any number of prediction bins. The y-axis of the chart 1100 illustrates the probability of each bin from zero to one, i.e., a probability distribution, i.e., $\hat{p}(E_n)$.

Referring now to FIG. 12, a chart 1200 of a Gaussian mixture model of one probability distribution of the predicted probability distributions of the LSTM S2S neural network 916 is shown, according to an exemplary embodiment. The chart 1200 may indicate the probability of a continuous range of energy values and may be a single output of the decoder 923, e.g., $\hat{p}(E_{t+2})$ or any other output. The chart 1200 illustrates a potential output of the decoder 928, i.e., a Gaussian mixture model although the output can also be the histogram as described with reference to FIG. 11 or any other modeling of probability.

The x-axis of the chart 1200 illustrates the energy values of a continuous range of energy values at a particular time-step, i.e., $E_n$, while the y-axis represents probability distribution, i.e., $\hat{p}(E_n)$. The Gaussian mixture model can be made up of one or multiple components, e.g., component 1202 and 1204. The Gaussian mixture model may include a mean, a standard deviation, and a mixture weight for each component. For example, the Gaussian mixture model may be a set of parameters, e.g., $(\{\mu_1, \sigma_1, w_1\}, \{\mu_2, \sigma_2, w_2\} \ldots \{\mu_m, \sigma_m, w_m\})$, i.e., m number of components each including a mean, $\mu$, a standard deviation, $\sigma$, and a mixture weight, w. For the $m^{th}$ Gaussian mixture (component) $\{\mu_m, \sigma_m, w_m\}$ represents the $m^{th}$ mean, the $m^{th}$ standard deviation, and the $m^{th}$ mixture weight.

Referring now to FIG. 13, the LSTM S2S neural network 920 of FIG. 9 shown in greater detail in a training phase with emphasis on actual probability distributions fed into the LSTM S2S neural network, according to an exemplary embodiment. The network illustrated in FIG. 13 may be the same as the network illustrated in FIG. 10, however, FIGS. 14 and 15 describe the actual probability distributions 930 and thus in FIG. 13 the sequence of the actual probability distributions 930 are bolded. During the training phase, the input to the decoder 928 at any time-step, n+1, is an actual distribution of energy realized at the previous time-step. FIGS. 14 and 15 provide two scenarios where a histogram and a Gaussian mixture model are used for actual distributions, i.e., $p(E_n)$.

Referring now to FIG. 14, a chart 1400 of a histogram of the actual probabilities for bins, i.e., one of the actual probability distributions 930, fed into the LSTM S2S neural network of FIG. 13 during the training phase is shown, according to an exemplary embodiment. The chart 1400 illustrates a single actual probability distribution of the actual probability distributions 930, e.g., $p(E_{t+3})$ or any other one of the probability distributions. Since the actual probability distributions 930 are known and are used during the training phase to train the LSTM S2S neural network 916, for a particular probability, the totality of the probability is within a single bin of a set of predefined bins at a particular time-step. Accordingly, a probability of one for a particular bin in the chart 1400 is shown in FIG. 14 and all other bins are shown with a probability of zero.

Referring now to FIG. 15 a chart 1500 of a Gaussian mixture model of one of the actual probability distributions 930 fed into the LSTM S2S neural network 916 of FIG. 13 during the training phase is shown, according to an exemplary embodiment. Because the probability lies at a particular value, the Gaussian mixture model is represented with one component 1502 that has all of the mixture of the model, i.e., a mixture of 1. The Gaussian mixture model is ($\{\mu_1=E_n, \sigma_1=\delta, w_1=1\}, \{\mu_2, \sigma_2, w_2=0\} \ldots \{\mu_m, \sigma_m, w_m=0\}$) where $\delta$ is infinitesimally small configurable hyper-parameter and the mean, $\mu_1$, is the energy at the current time-step, n. In some embodiments, for the components with a mixture value set to zero, the mean and standard deviation values of these components may be arbitrary or irrelevant. In some embodiments, the mean and standard deviation values of these components are non-zero. In some embodiments, the training manager 916 is configured to keep the mean and standard deviation values to be non-zero, in some embodiments. The training manager 916 may keep the standard deviation to be non-zero since a zero value for a standard deviation may result in an irregular or undefined Gaussian distribution.

Figure 16:
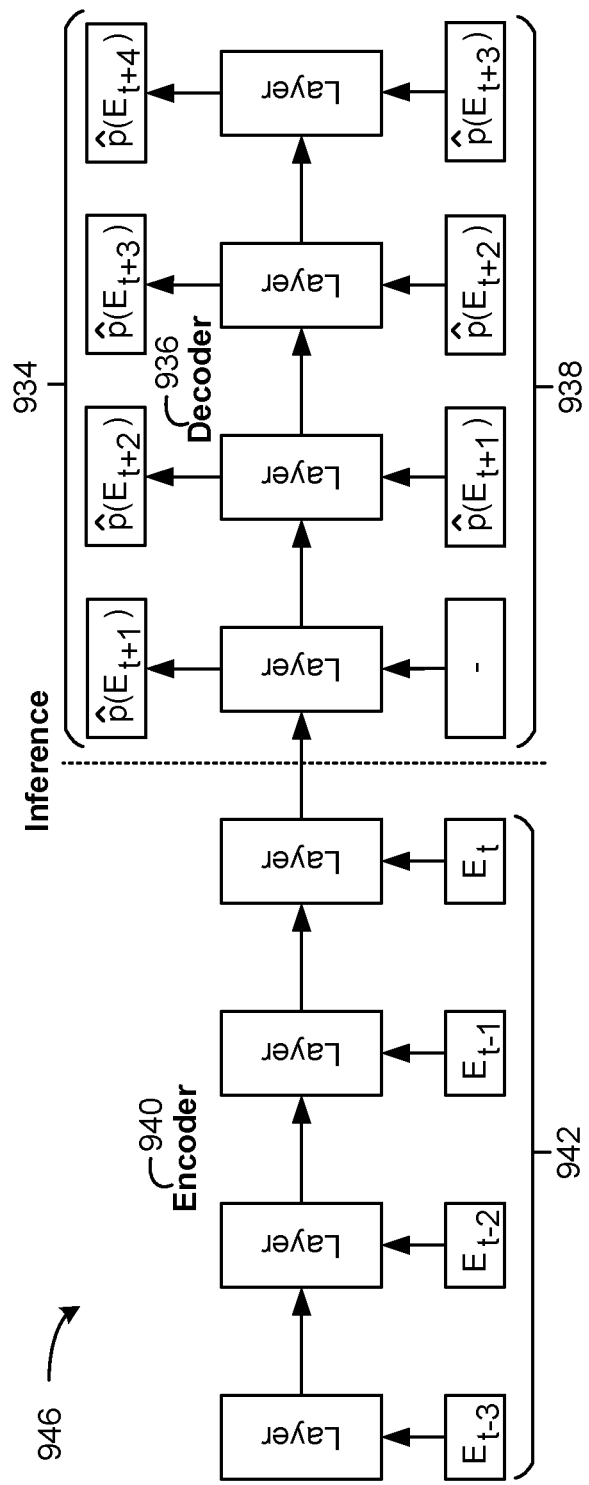
FIG. 16 is a block diagram of the LSTM S2S neural network of FIG. 9 shown in greater detail in an inference phase where predicted probability distributions are fed back into the LSTM S2S neural network, according to an exemplary embodiment.

Referring now to FIG. 16, the LSTM S2S neural network 946 of FIG. 9 is shown in greater detail in an inference phase where predicted probabilities are fed back into the LSTM S2S neural network 946, according to an exemplary embodiment. During the inference phase, where the LSTM S2S neural network 946 operates on a buffer of collected data, output of the decoder 936 at any time-step, n, is an estimated distribution of energy at that time-step, i.e., the estimated distribution $\hat{p}(E_n)$ which may be probabilities of multiple predefined bins (a histogram) or probabilities of a range of energy values of a Gaussian mixture model. Both the histogram and Gaussian mixture model representations of the distribution are described in FIGS. 11-12 and 14-15. The actual values 942 can be a buffer of collected energy data that is collected in real-time or can alternatively be historical data that the LSTM S2S neural network 946 is operated against to determine the performance of the LSTM S2S neural network 946.

During the inference phase, input of the decoder 936, i.e., the inferred probability distributions feedback 938, at any time-step, n+1, is estimated based on a distribution of energy at previous time-step. As can be seen from FIGS. 10 and 13, this is a different decoder input than during the training phase. During the training phase, noisy density estimates are not passed into the decoder, instead accurate density estimates are passed into the encoder. This is intended to prevent the LSTM S2S neural network from memorizing noise.

Figure 17:
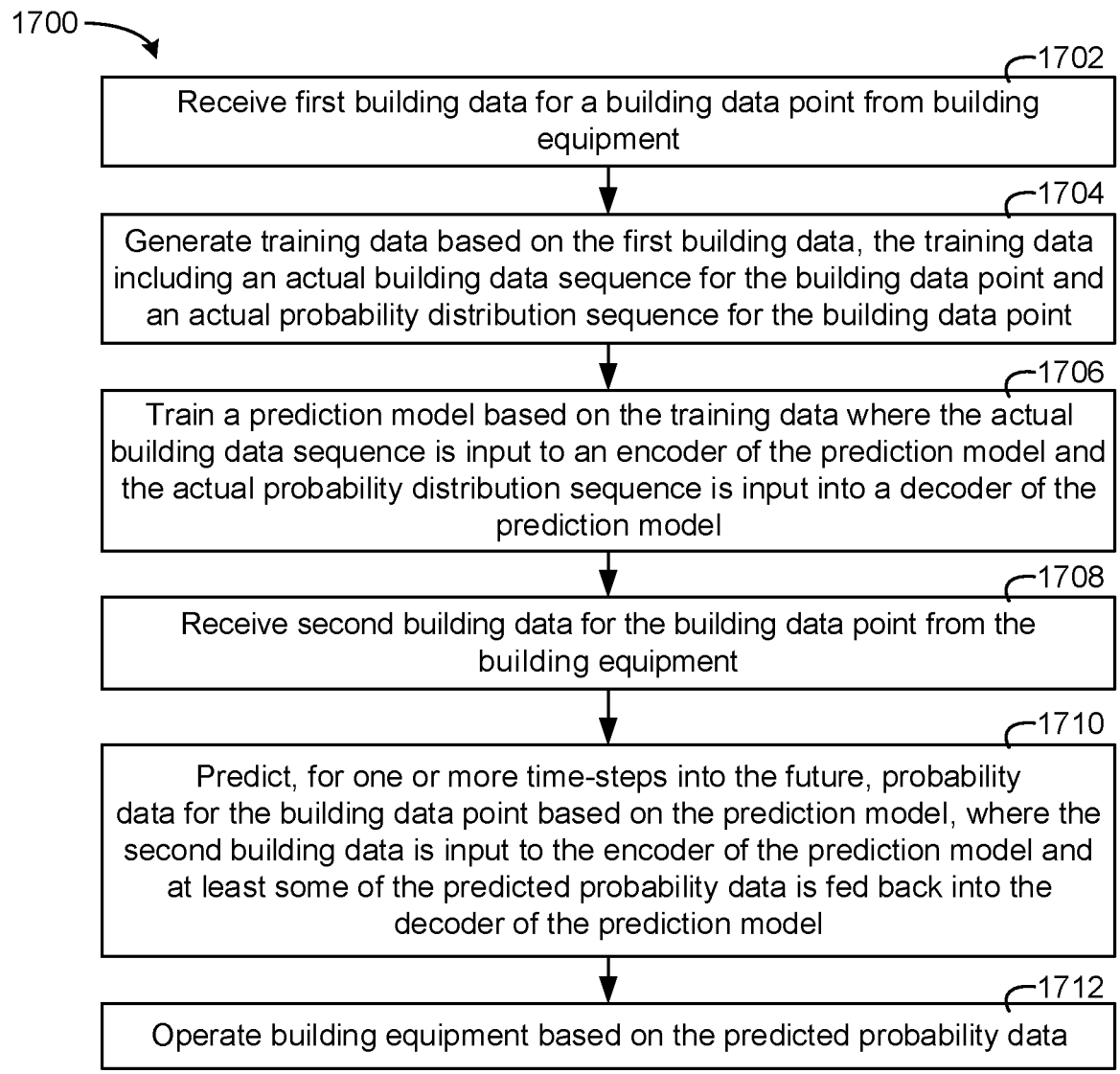
FIG. 17 is a flow diagram of a process of training a LSTM S2S neural network and performing inference with the LSTM S2S neural network to generate a probabilistic data point forecast, according to an exemplary embodiment.

Referring now to FIG. 17, a process 1700 of training the LSTM S2S neural network 920 and performing inference with the trained LSTM S2S neural network 946 to generate a probabilistic data point forecast is shown, according to an exemplary embodiment. Any system or device described herein can be configured to perform some and/or all of the process 1700. In some embodiments, the probabilistic energy forecast system 902 is configured to perform some and/or all of the steps of the process 1700. For example, components of the probabilistic energy forecast system 902, i.e., the training manager 916 and/or the inference manager 918 are configured to perform the process 1700. Furthermore, the building controller 912 can be configured to perform some and/or all of the process 1700.

In step 1702, the training manager 916 receives building data from the building equipment 910. In some embodiments, the building data is data of a particular data point of the building equipment 910. In some embodiments, the building data is used to calculate a data point. In some embodiments, the data point is an outdoor ambient temperature data point, an energy usage data point, a humidity data point, an electric grid energy price, etc.

In step 1704, the training manager 916 generates training data based on the first building data. The training data can include an actual building data sequence for the building data point and an actual probability distribution sequence for the building data point. For example, the actual building data sequence can be the actual data values as a time-series of samples at a predefined sample period. Furthermore, the training data can be a probability distribution for particular predefined bins of the data point (a set of predefined value ranges) as a time-series of samples at the predefined sample period. The probability distribution sequence can be represented as a histogram at each data point of the sequence for the predefined bins and/or a Gaussian mixture model for a range of values at each data point.

In step 1706, the training manager 916 can train a prediction model, for example, an LSTM S2S neural network and/or any other type of prediction model. The prediction model may include an encoder and a decoder where the encoder encodes a sequence into a vector and the decoder decodes the vector back into a sequence. The training manager 916 can utilize the training data generated in the step 1704 to train the prediction model. The actual data sequence of the step 1704 can be input into the encoder while the probability distribution sequence of the step 1704 can be input into the decoder. The result of training the prediction model may be a prediction model with identified values for weights and/or parameters identified through the training.

In step 1708, the training manager 916 can receive second building data for the building data point from the building equipment. The second building data can be real-time data (e.g., collected and/or buffered data). In some embodiments, the second building data is historical data used to test the training of the prediction model.

In step 1710, the inference manager 918 can predict, for one or more time-steps, a probability distribution for the building data point into the future based on the prediction model. The probability distribution may be a probability distribution for the predefined bins for each of the one or more samples. In some embodiments, the prediction of the training manager 916 is histogram data for each of the one or more time-steps, i.e., a probability of each predefined bin and/or a Gaussian mixture model. Rather than feeding training data, i.e., the actual probability distribution sequence into the decoder of the prediction model, the inference manager 918 can feed at least some of the one or more time-steps back into the decoder.

In step 1712, the building controller 912 can be configured to perform one or more control operations based on the probability distribution. In some embodiments, the data is used to operate equipment to heat or cool a building, cause equipment to store or discharge energy, etc. Furthermore, in some embodiments, the user presentation system 914 can generate one or multiple graphical interfaces with the probability distribution allowing a user to review the future predictions of the building data point.

Figure 18:
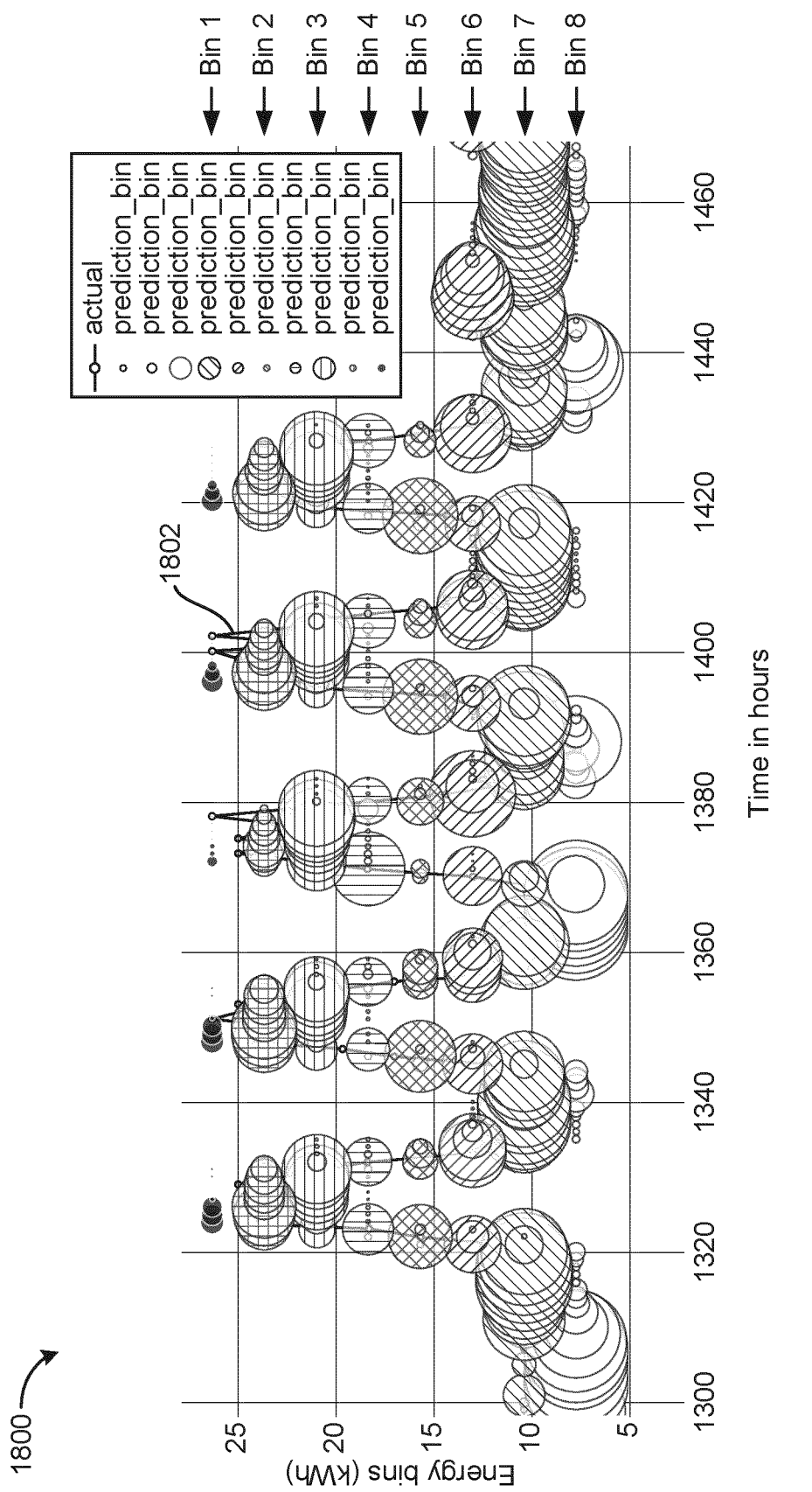
FIG. 18 is a chart of a probabilistic forecast for multiple days generated by the LSTM S2S neural network of FIG. 9, according to an exemplary embodiment.

Referring now to FIG. 18, a chart 1800 of a probabilistic forecast for multiple days generated by the LSTM S2S neural network 946 of FIG. 9 is shown, according to an exemplary embodiment. The results shown in the chart 1800 are generated as six hour ahead energy predictions. Each of the bubbles shown in the chart 1800 represent the probability of a particular energy bin. The larger the size of the bubble, the greater the probability. As shown, eight bins are included in total. The actual energy values recorded is shown by trend line 1802.

Figure 19:
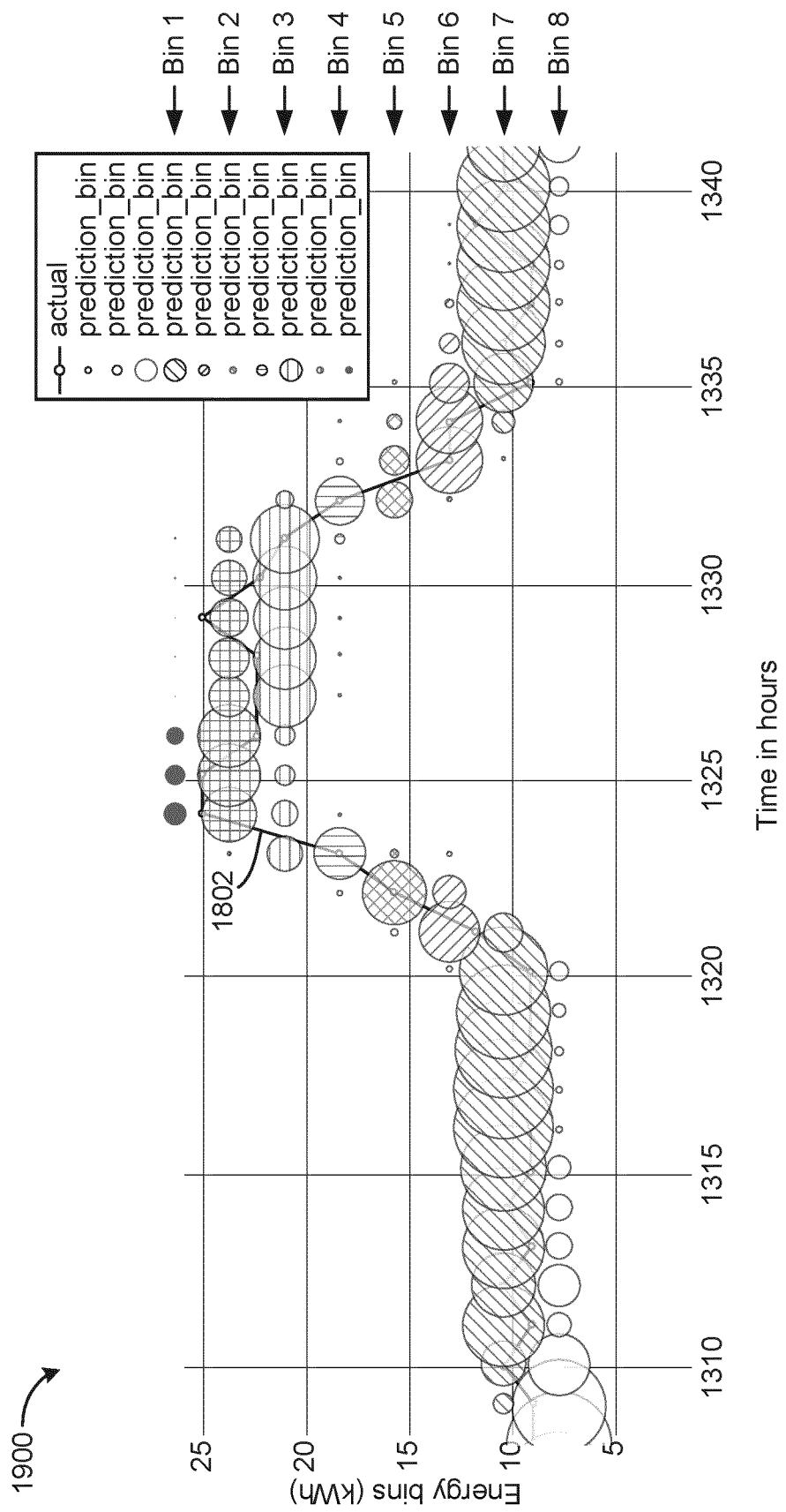
FIG. 19 is a zoomed in version of the chart of FIG. 18 illustrating the probabilistic forecast of one day, according to an exemplary embodiment.

Referring now to FIG. 19, a chart 1900 of the probabilistic forecast of FIG. 18 zoomed in on a single day. Again, the probabilistic forecast remains a six hour ahead energy prediction. Again, the size of the bubblers represent probability with the larger the size of the bubble, the greater the probability. Eight energy bins are shown in total in the chart 1900. The actual energy values recorded for the single day are indicated by the trend line 1802.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system for probabilistic building data point forecasting, the building system comprising one or more memory devices configured to store instructions thereon that, when executed by one or more processors, cause the one or more processors to:
   receive first building data for a building data point of a building;
   generate training data based on the first building data, the training data comprising a probability distribution sequence comprising a first probability distribution for the building data point at each of a plurality of time-steps;
   train a prediction model based on the training data;
   receive second building data for the building data point; and
   predict, for one or more time-steps into the future, one or more second probability distributions with the prediction model based on the second building data, each of the one or more second probability distributions being a probability distribution for the building data point at one of the one or more time-steps.

2. The building system of claim 1, wherein the instructions cause the one or more processors to perform at least one of:
   operating one or more pieces of building equipment based on the one or more second probability distributions; or
   generating one or more user interfaces including interface elements, the interface elements based on the one or more second probability distributions.

3. The building system of claim 1, wherein the building data point is an energy consumption data point indicating total energy consumption of the building.

4. The building system of claim 1, wherein the first probability distribution for the building data point at each of the plurality of time-steps indicates first probabilities of a plurality of predefined bins, each of the plurality of predefined bins representing a predefined range of values of the building data point;
   wherein the one or more second probability distributions indicate second probabilities of the plurality of predefined bins.

5. The building system of claim 1, wherein the prediction model comprises an encoder and a decoder;
   wherein the training data further comprises an actual value sequence of actual values of the building data point;
   wherein the instructions cause the one or more processors to train the prediction model based on the training data with the actual value sequence as an encoder input into the encoder and the probability distribution sequence as a decoder input into the decoder.

6. The building system of claim 1, wherein the prediction model comprises an encoder and a decoder;
   wherein the second building data comprises an actual value sequence of actual values of the building data point;
   wherein the instructions cause the one or more processors to predict, for the one or more time-steps into the future, the one or more second probability distributions with the second building data based on the prediction model with the actual value sequence as an encoder input into the encoder and at least one of at least some of the one or more second probability distributions or one or more previously predicted probability distributions as decoder inputs into the decoder.

7. The building system of claim 1, wherein the prediction model is a recurrent neural network (RNN) sequence to sequence (S2S) model.

8. The building system of claim 7, wherein the RNN S2S model is a long-short term memory (LSTM) S2S neural network.

9. The building system of claim 1, wherein the first probability distribution for the building data point at each of the plurality of time-steps and the one or more second probability distributions are at least one of:
   a histogram indicating a probability level of a plurality of predefined bins with a particular probability value for each of the plurality of predefined bins; or
   a Gaussian mixture model indicating probability levels of a continuous range of energy values with a plurality of Gaussian components, each of the plurality of Gaussian components comprising a mean, a standard deviation, and a mixture value.

10. The building system of claim 9, wherein the histogram for the first probability distribution indicates the probability level with a probability of one for one of the plurality of predefined bins and a probability of zero for all other bins of the plurality of predefined bins.

11. The building system of claim 9, wherein the Gaussian mixture model for the first probability distribution indicates the probability levels of the continuous range of energy values with one Gaussian component of the plurality of Gaussian components with a particular mean of an actual data point value, an infinitesimally small standard deviation, and a particular mixture value of one, wherein the mixture value of each other Gaussian component of the plurality of Gaussian components is zero.

12. A method of probabilistic building data point forecasting, the method comprising:
   receiving, by a processing circuit, first building data for a building data point of a building;
   generating, by the processing circuit, training data based on the first building data, the training data comprising a probability distribution sequence comprising a first probability distribution for the building data point at each of a plurality of time-steps;
   training, by the processing circuit, a prediction model based on the training data;
   receiving, by the processing circuit, second building data for the building data point; and predicting, by the processing circuit, for one or more time-steps into the future, one or more second probability distributions with the prediction model based on the second building data, each of the one or more second probability distributions being a probability distribution for the building data point at one of the one or more time-steps.

13. The method of claim 12, wherein the first probability distribution for the building data point at each of the plurality of time-steps indicates first probabilities of a plurality of predefined bins, each of the plurality of predefined bins representing a predefined range of values of the building data point;
wherein the one or more second probability distributions indicate second probabilities of the plurality of predefined bins.

14. The method of claim 12, wherein the prediction model comprises an encoder and a decoder;
wherein the training data further comprises an actual value sequence of actual values of the building data point;
wherein training, by the processing circuit, the prediction model based on the training data comprises training the prediction model based with the actual value sequence as an encoder input into the encoder and the probability distribution sequence as a decoder input into the decoder.

15. The method of claim 12, wherein the prediction model comprises an encoder and a decoder;
wherein the second building data comprises an actual value sequence of actual values of the building data point;
wherein predicting, by the processing circuit, for the one or more time-steps into the future, the one or more second probability distributions with the second building data comprises predicting the one or more second probability distributions based on the prediction model with the actual value sequence as an encoder input into the encoder and at least one of at least some of the one or more second probability distributions or one or more previously predicted probability distributions as decoder inputs into the decoder.

16. The method of claim 12, wherein the prediction model is a recurrent neural network (RNN) sequence to sequence (S2S) model.

17. The method of claim 16, wherein the RNN S2S model is a long-short term memory (LSTM) S2S neural network.

18. The method of claim 12, wherein the first probability distribution for the building data point at each of the plurality of time-steps and the one or more second probability distributions are at least one of:
a histogram indicating a probability level of a plurality of predefined bins with a particular probability value for each of the plurality of predefined bins; or
a Gaussian mixture model indicating probability levels of a continuous range of energy values with a plurality of Gaussian components, each of the plurality of Gaussian components comprising a mean, a standard deviation, and a mixture value.

19. The method of claim 18, wherein the histogram for the first probability distribution indicates the probability level with a probability of one for one of the plurality of predefined bins and a probability of zero for all other bins of the plurality of predefined bins;
wherein the Gaussian mixture model for the first probability distribution indicates the probability levels of the continuous range of energy values with one Gaussian component of the plurality of Gaussian components with a particular mean of an actual data point value, an infinitesimally small standard deviation, and a particular mixture value of one, wherein the mixture value of each other Gaussian component of the plurality of Gaussian components is zero.

20. A building management system, the building management system comprising a processing circuit configured to:
receive building data for a building data point of a building; and
predict, for one or more time-steps into the future, one or more probability distributions with the building data based on the prediction model, each of the one or more probability distributions being a probability distribution for the building data point at one of the one or more time-steps;
wherein the prediction model is a model trained with training data, the training data comprising a probability distribution sequence comprising a particular probability distribution for the building data point at each of a plurality of time-steps.

* * * * *